(No Model.) 2 Sheets—Sheet 1.

T. WHITTAKER.
MOLD FOR BRICK MACHINES.

No. 434,221. Patented Aug. 12, 1890.

Witnesses

Inventor
Thomas Whittaker

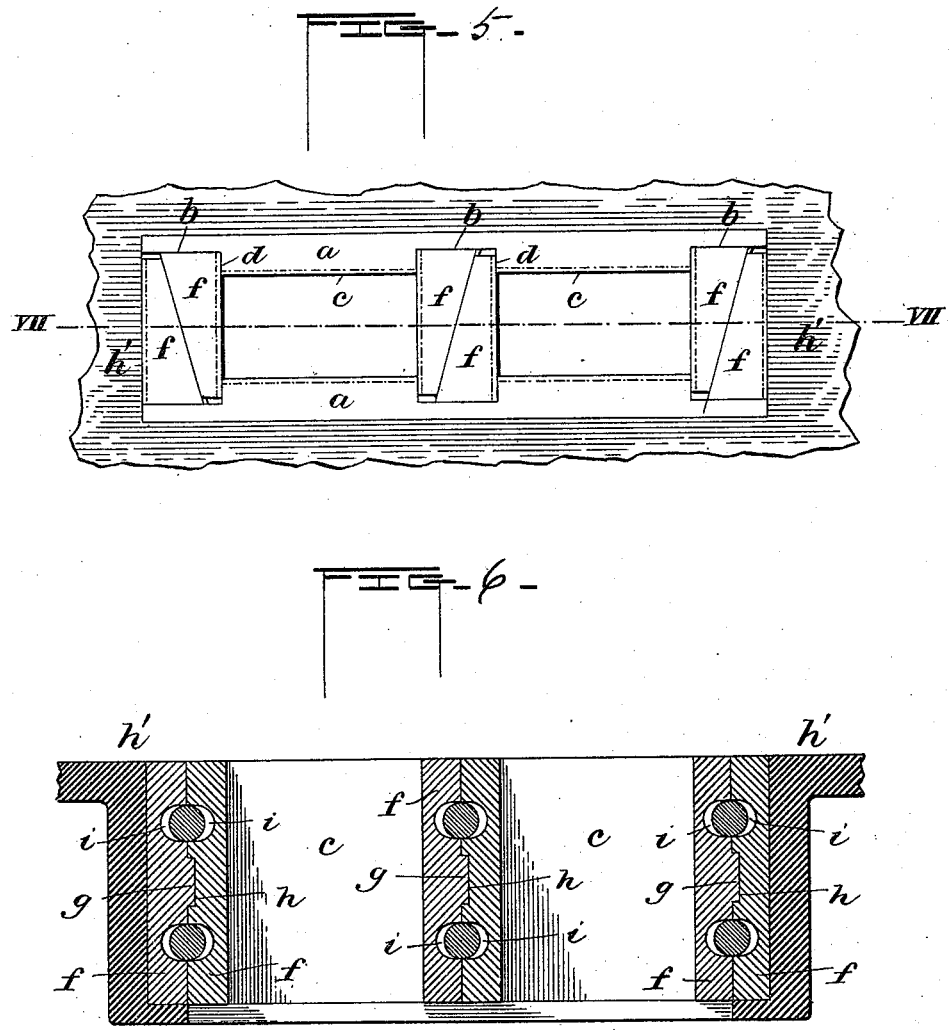

UNITED STATES PATENT OFFICE.

THOMAS WHITTAKER, OF ACCRINGTON, COUNTY OF LANCASTER, ENGLAND.

MOLD FOR BRICK-MACHINES.

SPECIFICATION forming part of Letters Patent No. 434,221, dated August 12, 1890.

Application filed October 31, 1889. Serial No. 328,792. (No model.) Patented in England January 17, 1889, No. 874.

*To all whom it may concern:*

Be it known that I, THOMAS WHITTAKER, of Accrington, in the county of Lancaster, England, have invented a new and useful Improvement in Molds for Brick-Making and like Machines, (for which I have obtained Letters Patent of Great Britain, No. 874, dated the 17th day of January, 1889, and nowhere else;) and I do hereby declare the following to be a full, clear, and exact description thereof.

My invention relates to the construction of molds for use in machines for pressing substances to form bricks and like articles.

The object is to so construct the mold that when the acting faces or surfaces are worn or damaged the said mold may be readily taken to pieces and after the worn or damaged faces or surfaces have been made true, whether by planing or otherwise, may be put together again without alteration of size.

The invention consists, essentially, in constructing a mold of parallel longitudinal pieces combined with pairs of wedge-shaped transverse pieces and bolts.

Figure 1:
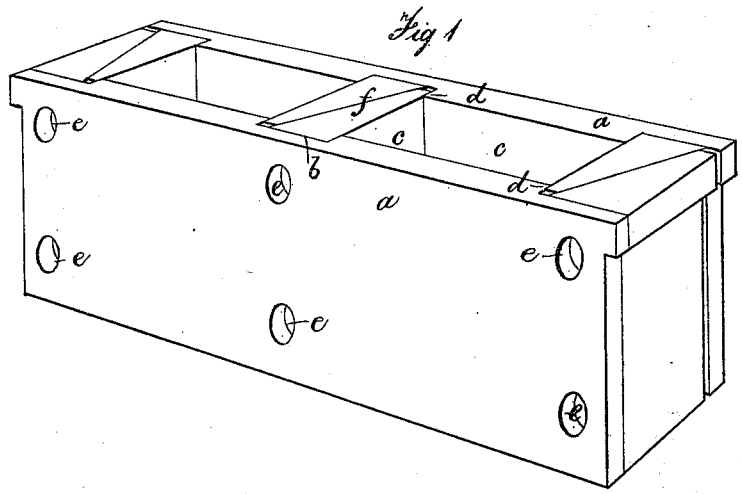
Figure 3:
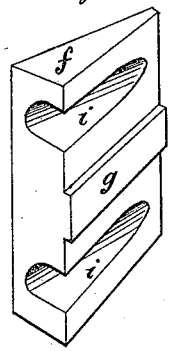
Figure 4:
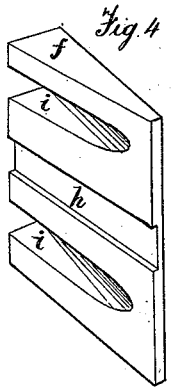
Figure 2:
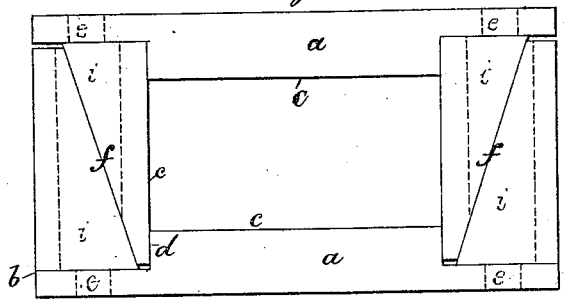

In the accompanying drawings, Figure 1 is a perspective view of a double mold embodying my invention. Fig. 2 is a plan view of a single mold. Figs. 3 and 4 are perspective views of the transverse pieces $f$, hereinafter described. Fig. 5 is a plan view of a double mold shown in position in the containing frame or table. Fig. 6 is a vertical longitudinal section on the line VII VII of Fig. 5.

In the drawings, $a\ a$ are the longitudinal side pieces of the mold, which are recessed at $b$, so as to afford faces $c$ and abutments $d$. In the case of the double mold (shown in Figs. 1 and 5) there are such recesses at the middle as well as at the ends of the side pieces. In the case of the single mold (shown in Fig. 2) there are recesses only at the ends of the side pieces.

$e\ e$ are bolt-holes formed in the sides $a$ opposite to the recesses $b$. The cross-partitions of the mold are formed by wedge-shaped pieces $f$ arranged in pairs, one of each pair being preferably made with a lateral tongue $g$ and the other with a corresponding groove $h$, into which the tongue fits. The pieces $f$ are also provided with grooves $i$, which when the pieces are put together form holes, which register with the holes $e$ and receive the bolts by which the sides of the mold are held together.

$h'$ is the table or frame of the brick-press in which the mold is set. The parts of the mold are placed together, as shown in the drawings, the side pieces $a\ a$ being set parallel with each other, and the wedge-shaped pieces $f$ being set in pairs side to side, their ends fitting in the recesses $b$ and the parts being held together by the transverse bolts above mentioned. The mold thus constituted is set in its recess or opening in the usual table $h'$, as shown in Figs. 5 and 6. With this construction it is apparent that as the inner faces of the mold become worn its parts may be removed and planed or trued, (the cut-away portions being indicated by dotted lines in Fig. 5,) that in refitting the parts together, as the cross-pieces $f$ fit against the abutments $d$, the length of the mold will not be altered, and that because of the wedge shape of the cross-pieces the side pieces will approach each other just enough to compensate for the portions cut away. The end pieces of the mold are held in position by the walls of the opening in the table $h$.

The advantages of my improvement will be appreciated by those familiar with the art to which it appertains.

I am aware of British Letters Patent No. 8,975 of 1886, and disclaim what is therein shown and described.

I claim—

In a mold, side pieces having lateral recesses for reception of the cross-pieces, in combination with such cross-pieces, each consisting of two wedge-shaped parts $ff$, having their inclined inner faces in contact, and an inclosing-table $h'$, substantially as and for the purposes described.

In testimony whereof I have hereunto set my hand this 14th day of October, A. D. 1889.

THOMAS WHITTAKER.

Witnesses:
  GEO. W. PICKUP,
    *Notary Public, Accrington.*
  H. ALSTON,
    *Clerk to the said Geo. W. Pickup.*